United States Patent
Mahmoud

(10) Patent No.: US 6,567,911 B1
(45) Date of Patent: May 20, 2003

(54) METHOD OF CONSERVING MEMORY RESOURCES DURING EXECUTION OF SYSTEM BIOS

(75) Inventor: Fadi A. Mahmoud, Fremont, CA (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/455,301

(22) Filed: Dec. 6, 1999

(51) Int. Cl.[7] .................... G06F 15/177; G06F 9/00; G06F 12/00
(52) U.S. Cl. .................. 713/2; 713/1; 711/100
(58) Field of Search ............... 713/1, 2, 100; 711/100

(56) References Cited

U.S. PATENT DOCUMENTS

| | | | |
|---|---|---|---|
| 5,430,845 A | | 7/1995 | Rimmer et al. ......... 395/275 |
| 5,671,413 A | * | 9/1997 | Shipman et al. ............ 713/2 |
| 5,680,556 A | | 10/1997 | Begun et al. ............ 395/311 |
| 5,835,760 A | * | 11/1998 | Harmer ..................... 713/2 |
| 5,836,013 A | * | 11/1998 | Greene et al. .............. 713/2 |
| 5,841,953 A | * | 11/1998 | Rohatgi .................. 358/1.15 |
| 5,901,310 A | * | 5/1999 | Rahman et al. ............. 713/1 |
| 5,905,888 A | | 5/1999 | Jones et al. ............. 395/652 |
| 5,951,684 A | | 9/1999 | Jeon ....................... 713/1 |
| 5,951,685 A | | 9/1999 | Stancil .................... 713/2 |
| 6,003,103 A | * | 12/1999 | Klein ...................... 710/306 |
| 6,009,520 A | * | 12/1999 | Gharda ..................... 713/1 |
| 6,061,745 A | * | 5/2000 | Mahmoud ................... 710/1 |
| 6,145,078 A | * | 11/2000 | Akamatsu ................... 713/2 |
| 6,173,381 B1 | * | 1/2001 | Dye ....................... 711/170 |
| 6,182,213 B1 | * | 1/2001 | Klein ...................... 713/2 |
| 6,216,225 B1 | * | 4/2001 | Yoo ....................... 713/2 |
| 6,282,644 B1 | * | 8/2001 | Ko ........................ 713/2 |
| 6,282,647 B1 | * | 8/2001 | Leung et al. ............. 713/100 |
| 6,298,422 B1 | * | 10/2001 | Spilo et al. .............. 711/154 |
| 6,370,631 B1 | * | 4/2002 | Dye ....................... 711/170 |
| 6,393,492 B1 | * | 5/2002 | Cornaby et al. ............ 709/321 |
| 6,401,198 B1 | * | 6/2002 | Harmer et al. .............. 713/1 |
| 6,434,695 B1 | * | 8/2002 | Esfahani et al. ............ 713/2 |

\* cited by examiner

*Primary Examiner*—Thomas Lee
*Assistant Examiner*—Chun Cao
(74) *Attorney, Agent, or Firm*—Martine & Penilla, LLP

(57) ABSTRACT

Methods of conserving memory resources available to a computer system during execution of a system BIOS are provided. The method includes (a) executing the system BIOS; (b) loading the header, runtime code, and memory allocator code associated with the option ROM BIOS chip into the option ROM memory space; (c) passing control to the memory allocator code; (d) executing the memory allocator code to allocate conventional memory of the system RAM; (e) copying the decompressor code from the option ROM BIOS chip to the allocated conventional memory; (f) passing control to the decompressor code; (g) executing the decompressor code to decompress the compressed initialization code directly from the option ROM BIOS chip and thus loading the decompressed initialization code into the conventional memory; and (h) executing the decompressed initialization code to initialize the adapter card or controller.

21 Claims, 6 Drawing Sheets

METHOD OF CONSERVING MEMORY RESOURCES DURING EXECUTION OF SYSTEM BIOS

BACKGROUND OF THE INVENTION

1. Field of the Invention

This invention relates generally to the field of computing technology and more particularly concerns the initialization routine of a computer system which prepares the system for the loading of an operating system.

2. Description of the Related Art

During a computer system's initialization routine, commonly referred to as a boot sequence, a variety of diagnostics are performed to ascertain the availability and status of hardware devices and ensure proper operation of components. For example, during initialization, a system BIOS executes a boot program which invokes a series of system checks to ascertain the location, number and identity of various devices connected to the computer system. The processing components may be a variety of host adapter cards including, by way of example only, a video display adapter, a network adapter, a SCSI adapter or other similar device. Further, these host adapters cards may either be non-processor based, such as some SCSI and RAID controllers, or may be processor based, such as some high end or low end RAID controllers.

In any event, each of these processing components have an associated option ROM BIOS chip 20, as shown in FIG. 1A. The option ROM BIOS chip 20 includes program instructions known as the option ROM BIOS, and is also referred to herein as a BIOS image 22. As the need for more functionality in the initialization process continues to grow, the BIOS image 22 necessarily grows in size. A typical size of a BIOS images 22 utilized in RAID controller applications is about 64K. The contents of the BIOS image 22 includes, among other things, a header, memory allocator code, decompressor code, runtime code, initialization code, and configuration utility code. A typical processor-based RAID controller, such as the AAA-130SA ULTRA WIDE SCSI RAID Card manufactured by the Adaptec, Inc. of Milpitas, Calif. may have a compressed BIOS image size of approximately 64K.

At boot-up, the system BIOS loads the BIOS image 22 to the system RAM 40. As is well known, the BIOS image 22 is loaded to an area of the system RAM that is dedicated for this use. As shown in FIG. 1B, a hexadecimal address range between C800:00 and DFFF:00 is often referred to as option ROM memory space. For discussion purposes, it should be assumed that BIOS image-1 22a represents the copied 64K BIOS image 22. Once the BIOS image is copied to this memory space, selected portions of the BIOS image are decompressed and copied to conventional memory 42. The decompressed code is then implemented to initialize the host adapter associated with the option ROM BIOS chip 20.

Although no problems arise during the initialization of option ROM BIOS chip 20, there many situations in which a computer system needs to initialize several option ROM BIOS chips. Because the size of the BIOS image continues to grow, the option ROM memory space can be quickly consumed. This problem is pictorially illustrated in FIG. 1B, where four BIOS images 22a, 22b, 22c and 22d need to be copied to the option ROM memory space. In this example, BIOS image-1 22a, BIOS image-2 22b, and BIOS image-3 22c were successfully copied, however, BIOS image-4 22d did not fit within the fixed option ROM memory space. As such, the controller having the BIOS image 22d will not be initialized. Of course, if a controller is not initialized, the devices (e.g., hard disks, CD-ROMs, etc.) connected to the controller will not be available to the user of the computer system.

Were system BIOS to encounter uncompressed BIOS images, there might also be a problem because these uncompressed BIOS images might occupy a footprint of more than 64K. This would initially occupy even more memory when initially copied from an associated option ROM BIOS chip into the option ROM memory space. This problem of insufficient memory is further exacerbated by those systems operating in a BIOS boot specification (BBS) environment. In BBS, the system BIOS actually passes through an option ROM twice during a boot sequence, and each time the option ROM has a different size.

In view of the foregoing, what is needed is a new and improved methodology for conserving memory resources available to a computer system during execution of the system BIOS in order to reduce the amount of memory area that is occupied by the system's various BIOS images. Such an approach would thereby ensure proper initialization of the computer system.

SUMMARY OF THE INVENTION

Broadly speaking, the present invention fills these needs by providing computer implemented methods for conserving memory resources available to a computer system during execution of the system BIOS. To this end, the computer system includes a processing component, such as an adapter card or a controller, having an associated BIOS image. The BIOS image is characterized at least in part by a header, a runtime code and an initialization code. The computer system also preferably includes system memory (e.g., a system RAM) having an option ROM memory space of a confined size for accommodating a reduced portion of the BIOS image (e.g., a reduced footprint). The methods of the present invention are thus adapted to reduce the amount of memory within the option ROM memory space that is occupied by the BIOS image during execution of a boot sequence thereby to allow for proper initialization of the adapter card. In one embodiment, the BIOS image is contained in an option ROM BIOS chip, and the chip can be integrated onto a host adapter card or a motherboard. It should be appreciated that the present invention can be implemented in numerous ways, including as a process, an apparatus, a system, a device, a method, or a computer readable medium. Several inventive embodiments of the present invention are described below.

In one embodiment, a method of conserving memory resources available to a computer system during execution of system BIOS is provided. The computer system includes a processing component (e.g., a chip) having an associated BIOS image that is characterized at least in part by a header, a runtime code and an initialization code. The computer system further including a system RAM having an option ROM memory space of a confined size for accommodating at least a portion of the BIOS image, and the method is adapted to reduce the amount of memory within the option ROM memory space that is occupied by the BIOS image during execution of a boot sequence to allow for proper initialization of the processing component. The method includes loading into the option ROM memory space the portion including at least the header and runtime code that is associated with the BIOS image. The method then allocates conventional memory of the system RAM, and the allocated conventional memory is sized to accommodate at least a decompressed version of the initialization code associated with the BIOS image. Next, the method loads the decompressed version of the initialization code directly from the BIOS image into the allocated conventional memory. The decompressed version of the initialization code is then executed to initialize the processing component.

In another embodiment, a method of conserving memory resources available to a computer system during execution of a system BIOS is disclosed. The computer system includes an adapter card having an associated option ROM BIOS chip that includes a compressed BIOS image characterized at least by a header, a runtime code, a memory allocator code, a compressed initialization code, a compressed configuration utility and a decompressor code. The computer system further including a system RAM having an option ROM memory space of a confined size for accommodating at least a portion of the BIOS image. The method includes (a) executing the system BIOS; (b) loading the header, runtime code, and memory allocator code associated with the option ROM BIOS chip into the option ROM memory space; (c) passing control to the memory allocator code; (d) executing the memory allocator code to allocate conventional memory of the system RAM; (e) copying the decompressor code directly from the option ROM BIOS chip to the allocated conventional memory; (f) passing control to the decompressor code; (g) executing the decompressor code to decompress the compressed initialization code directly from the option ROM BIOS chip and to load the decompressed initialization code into the conventional memory; and (h) executing the decompressed initialization code to initialize the adapter card.

In yet another embodiment, a method of conserving memory resources available to a computer system during execution of a system BIOS is disclosed. The method includes loading a header, a runtime code, and a memory allocator code associated with an option ROM BIOS chip into an option ROM memory space of a system RAM, and the option ROM BIOS chip is associated with a controller. The method further includes executing the memory allocator code to allocate conventional memory of the system RAM, and copying the decompressor code from the option ROM BIOS chip to the allocated conventional memory. The decompressor code is then executed to decompress initialization code directly from the option ROM BIOS chip to load the decompressed initialization code into the conventional memory. The decompressed initialization code is then executed to initialize the controller.

In still another embodiment, a method of conserving system memory resources available to a computer system during boot up is disclosed. The method includes: (a) executing a system BIOS; (b) loading a header, a runtime code, a memory allocator code, and a decompressor code associated with an option ROM BIOS chip of a controller into an option ROM memory space of system memory; (c) passing control to the memory allocator code; (d) executing the memory allocator code to allocate conventional memory of the system memory; (e) passing control to the decompressor code; (f) executing the decompressor code to decompress initialization code directly from the option ROM BIOS chip to the allocated conventional memory; and (g) executing the decompressed initialization code to initialize the controller.

A computer implemented method is disclosed. The method includes loading a header, a runtime code, a memory allocator code, and a decompressor code associated with an option ROM BIOS chip of a controller into an option ROM memory space of system memory. The method then proceeds to execute the memory allocator code to allocate conventional memory of a system memory and to execute the decompressor code to decompress initialization code directly from the option ROM BIOS chip to the allocated conventional memory. The method then executes the decompressed initialization code to initialize the controller.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE EXEMPLARY EMBODIMENTS

An invention is described for a method of conserving memory resources available to a computer system during initialization routines controlled by a system BIOS. It will be obvious, however, to one skilled in the art, that the present invention may be practiced without some or all of these specific details. In other instances, well known process operations have not been described in detail in order not to unnecessarily obscure the present invention.

The memory conservation methodology of the present invention is adapted for use with a computer system during execution of the system BIOS. For purposes of this disclosure, the computer system includes at least one processing component having an associated BIOS image. In one preferred embodiment, this processing component is an adapter card having an associated option ROM BIOS chip including a BIOS image that is either compressed or uncompressed. In still other embodiments, the processing component can be in the form of a controller chip (e.g., a RAID controller, a SCSI controller, etc.), which may be integrated into a motherboard of a computer system as opposed to on an adapter card. In such a case, the controller chip is also generally associated with a BIOS image (i.e., in the form of an option ROM chip). In either case, the associated BIOS image is characterized at least in part by a header, such as a PCI device ID, a runtime code and an initialization code.

The computer system also includes a system RAM having an option ROM memory space of a confined size for accommodating at least a portion of this BIOS image.

As discussed above in the background section, the inability under certain circumstances for each of a computer system's various BIOS images to be loaded into the option ROM memory space of system RAM during a boot sequence renders the computer system unable to properly initialize each of its various controllers. It is therefore an embodiment of the present invention to reduce the amount of memory within this option ROM memory space that is occupied by a BIOS image during execution of a boot sequence, thereby to allow for complete initialization of the controllers associated with the computer system.

Figure 1A:
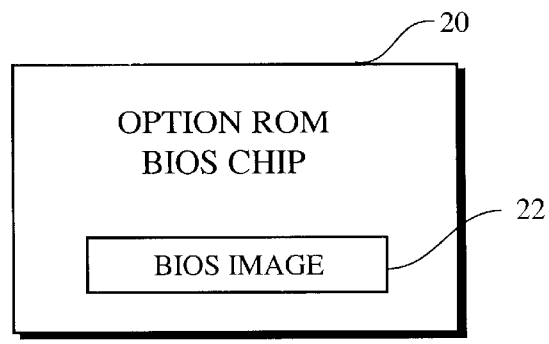
FIG. 1A is a block diagram representing an option ROM BIOS chip for an adapter card having a BIOS image.
Figure 1B:
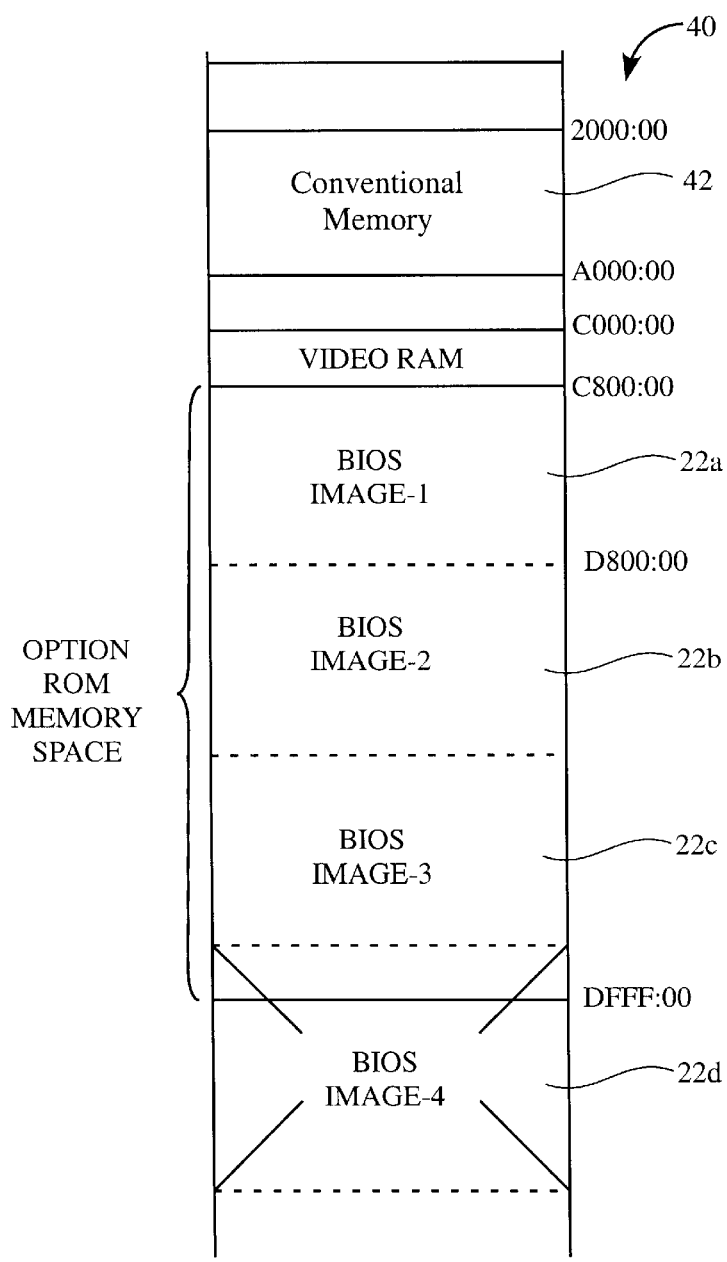
FIG. 1B is block digram illustrating the memory areas within the system RAM of a computer system.
Figure 2A:
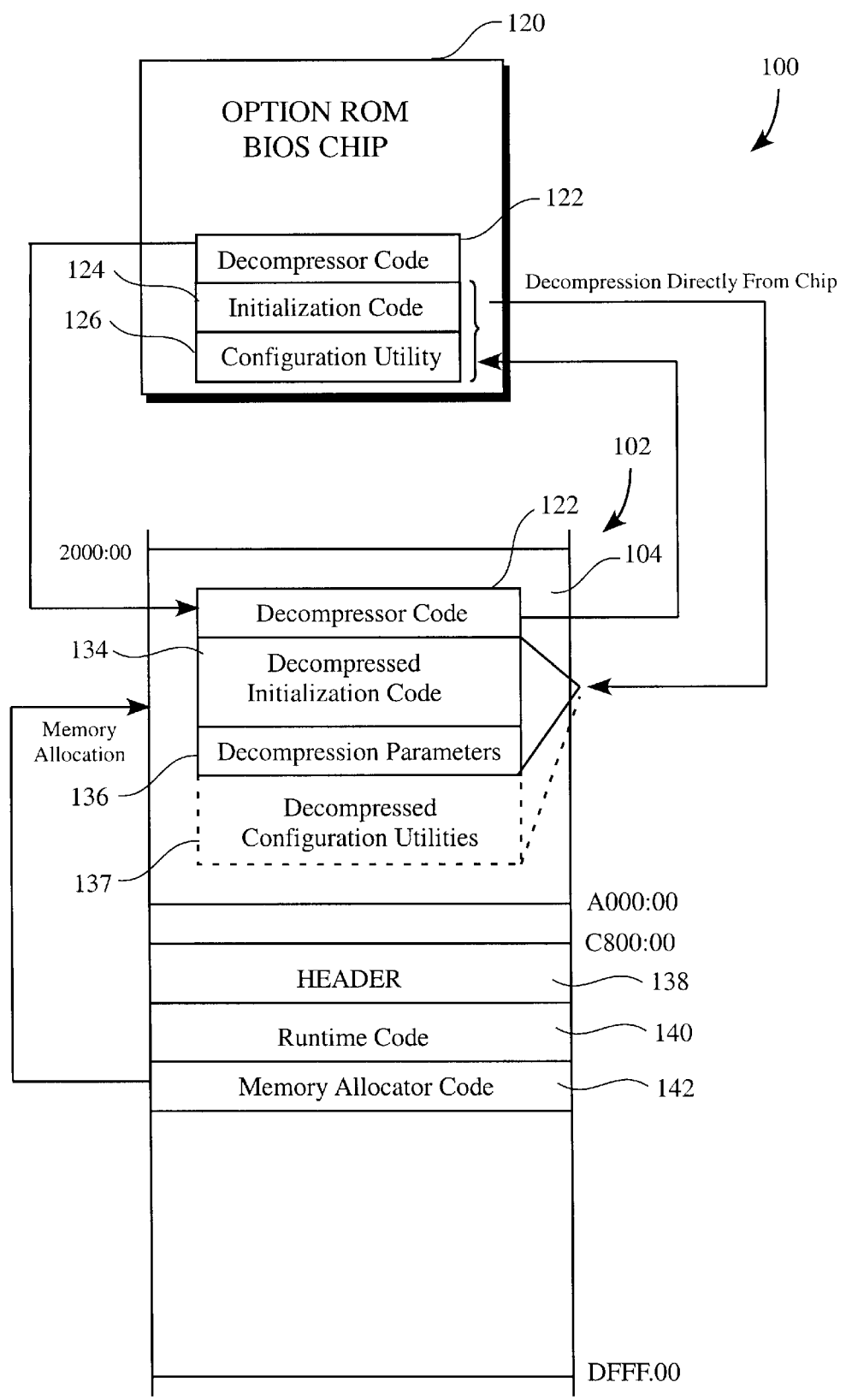
FIG. 2A illustrates a diagram that includes an option ROM BIOS chip and system RAM, in accordance with one embodiment of the present invention.

FIG. 2A illustrates a diagram 100 that includes an option ROM BIOS chip 120 and system RAM 102, in accordance with one embodiment of the present invention. At initialization, only a portion of the option ROM image associated with the option ROM BIOS chip 120 is loaded into the option ROM memory space defined between C800:00 and DFFF:00. In this embodiment, only a header 138, runtime code 140, and memory allocator code 142 are loaded from the option ROM BIOS chip 120 to the option ROM memory space. Thus, the header 138, runtime code 140 and memory allocator code 140 occupy about 16K of memory space. It should be noted that 16K is substantially less than if the entire image of 64K had been loaded. Of course, 16K is only an example, and the benefits of the invention will still apply so long as the loaded portion is less than the entire BIOS image. Once loaded, the memory allocator code 142 will allocate memory space in conventional memory 104 for decompressing certain components directly from the option ROM BIOS chip 120. For example, the allocated memory space may include 64K for initialization code, 16K for decompression parameters, and 4K for decompressor code. The allocated memory may also include additional space to support other decompression items.

Now that memory space has been allocated in conventional memory 104, the decompressor code 122 is copied to the conventional memory in the allocated space. In this embodiment, it should be noted that the decompressor code 122 is not loaded to the option ROM memory space. In this example, the header, the runtime code, and the memory allocator only occupy about 16K of option ROM memory space. This is in contrast to prior art implementations which need to copy the entire contents of the BIOS image into the option ROM memory space. In some RAID applications, the BIOS image can be as large as 64K, however, in accordance with an embodiment of the present invention, the same RAID application may only need to copy a portion of the BIOS image (e.g., 16K of the BIOS image).

The decompression code 122 is now executed to enable the decompression of initialization 124 into decompressed initialization code 134 directly from the option ROM BIOS chip 120. It is important to note that the decompression directly from the option ROM BIOS chip 120 allows only part of the option ROM code to be loaded into the option ROM memory space, thus reducing the footprint of the BIOS image. The decompression code 122 will also produce certain decompression parameters 136, which are also stored in the conventional memory 104. The decompressed initialization code 134 is then executed to enable the initialization of the controller associated with the option ROM BIOS chip 120.

In another features of this embodiment, if the user wants to implement a configuration utility, an interrupt can be initiated. For example, the user can cause an interrupt by pressing the keys <control> <A>. This interrupt will cause the memory allocator 142 to allocate additional memory in the conventional memory 104 for storing decompressed configuration utilities 137. The decompressed configuration utilities may include, for example, SCSI configuration, container configuration structures, container configuration, and the like. Now that the memory space is allocated in the conventional memory 104, the decompression code 144 will refer to the option ROM BIOS chip 120 and initiate direct decompression to the allocated conventional memory, thus storing decompressed configuration utilities 137. The decompressed configuration utilities 137 can then be executed to enable the user to perform desired configurations.

Figure 2B:
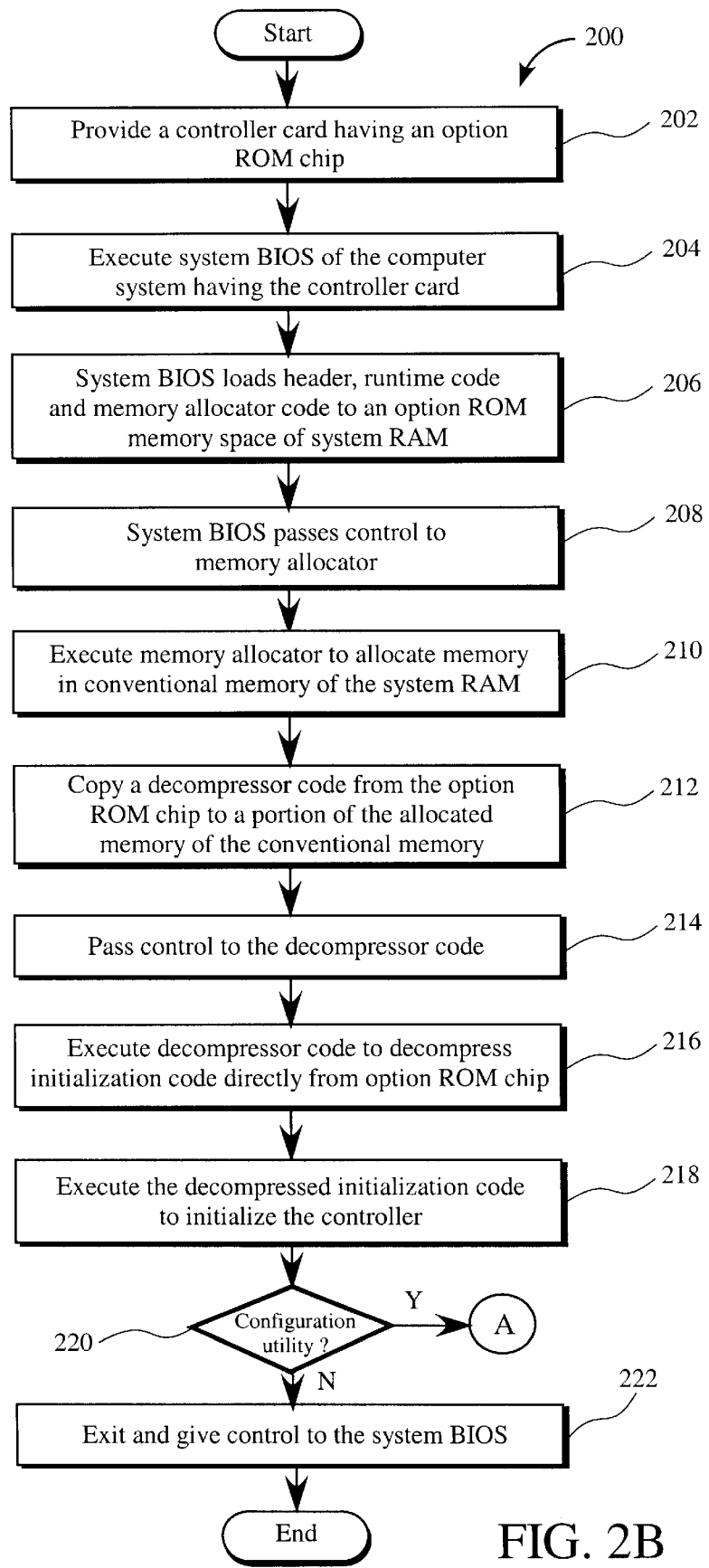
FIG. 2B illustrates a flowchart that defines the method operations implemented to initialize a controller, in accordance with one embodiment of the present invention.

FIG. 2B illustrates a flowchart 200 that defines the method operations implemented to initialize a controller, in accordance with one embodiment of the present invention. The method begins at an operation 202 where a controller card having an option ROM chip is provided. The method then advances to operation 204 where the system BIOS of the computer system having the controller card is executed. The system BIOS then loads in operation 206 a header, a runtime code, and a memory allocator from the option ROM chip to the option ROM memory space of the system RAM. The loaded parts thus represent a portion of the BIOS image.

The system BIOS then passes control to the memory allocator code in operation 208 and the memory allocator code is executed in operation 210. The allocator code is configured to allocate memory in conventional memory of the system RAM. The allocated memory space should be large enough to hold a decompressor code, decompressed initialization code, and decompression parameters. In one example, the decompressor code may be about 4K, the decompressed initialization code may be about 64K, and the decompression parameters may be about 16K.

In operation 212, decompressor code is copied from the option ROM chip to a portion of the allocated memory of the conventional memory. Once the decompressor code is copied to the conventional memory, control is passed to the decompressor code in operation 214. The decompressor code is then executed in operation 216 to enable decompression of the initialization code directly from the option ROM chip. By "directly," it is meant that the compressed initialization code does not have to be loaded to the option ROM memory space of the system RAM, but can remain on the option ROM chip. When decompression of the compressed initialization code is desired, only the uncompressed initialization code needs to be loaded to the system RAM. However, when loaded, the uncompressed initialization code is only loaded to the conventional memory and not to the option ROM memory space.

The uncompressed initialization code is then executed in operation 218 to enable initialization of the controller. For instance, if the controller has certain hard drive devices and other devices connected thereto, the computer system will be able see and access those devices. At this point, the method moves to a decision operation 220 where it is determined if the user wants to access a configuration utility. For example, if the user presses <control> <A>, the process will be interrupted. The configuration utility process is described in greater detail with reference to FIG. 4.

Figure 3A:
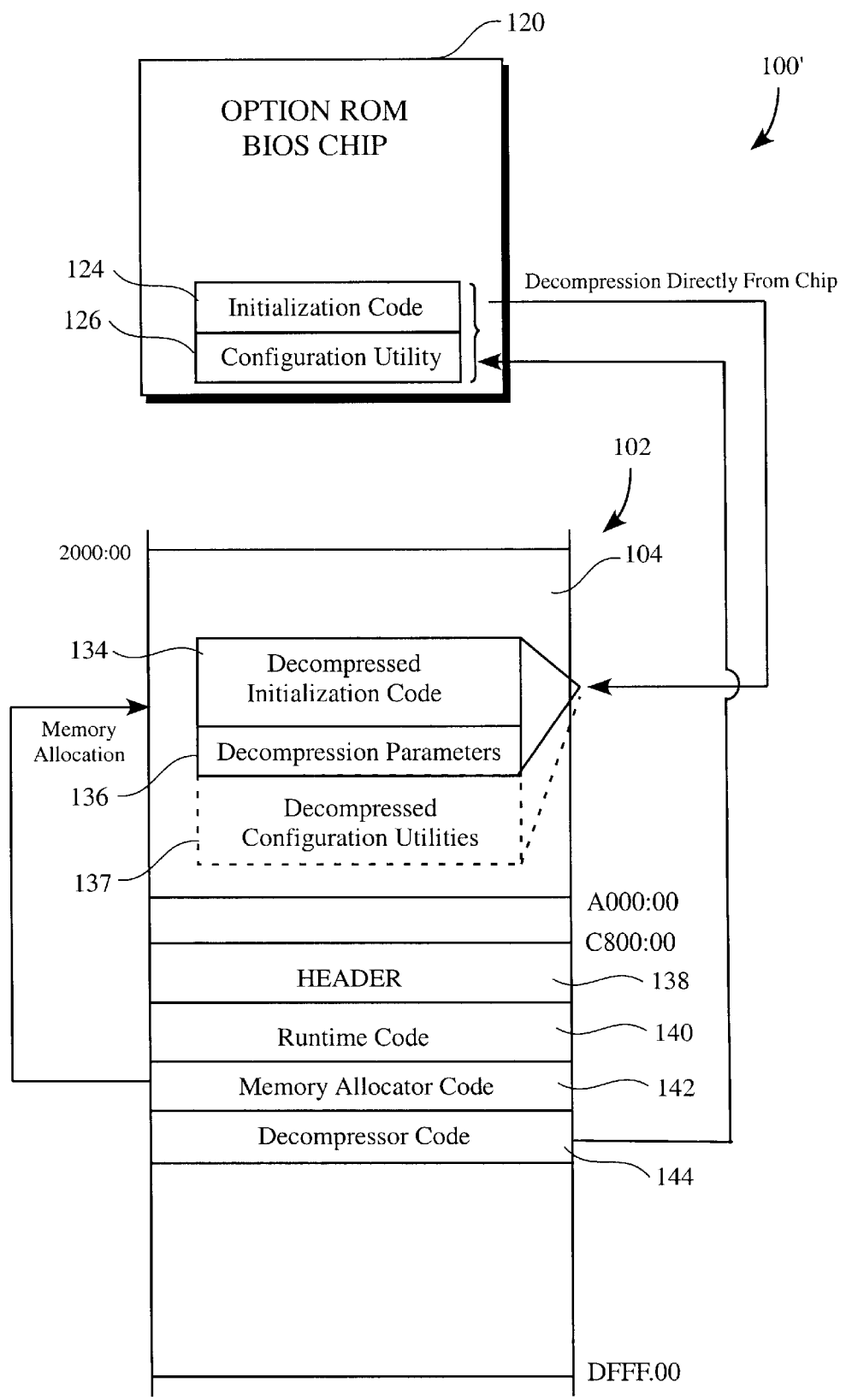
FIG. 3A illustrates a diagram that includes an option ROM BIOS chip and system RAM, in accordance with another embodiment of the present invention.

FIG. 3A illustrates a diagram 100' that includes an option ROM BIOS chip 120 and system RAM 102, in accordance with another embodiment of the present invention. In this embodiment, the decompressor code 144 is initially copied to the option ROM memory space between C800:00 and DFFF:00. This is in contrast to the embodiment discribed with reference to FIGS. 2A and 2B, which does not copy the decompressor code 144 to the option ROM memory space. Preferably, the decompressor code 144 will only occupy 4K of additional memory space, and therefore, should not significantly impact the usage of option ROM memory space. In opereation, the memory allocator code 142 is configured to allocate enough memory space in the conventional memory 104 to receive the decompressed initialization code and decompression parameters 136. Once allocated, the decompressor code 144 will communicate with the option ROM BIOS chip 120 to enable decompression of the initialization code 124 directly to the allocated memory in the conventional memory 104. Control can then be passed to the decompressed initialization code 134 in order to perform the initialization of the controller. As described above, the controller can be a SCSI controller, a RAID controller, or the like.

If desired, the user can also implement the configuration utility 126. It should be noted that the configuration utility 126 will remain on the option ROM BIOS chip until the user causes an interrupt. Of course, the user may wish not to implement the configuration utility 126, and therefore, will not be decompressed into the conventional memory 104.

Figure 3B:
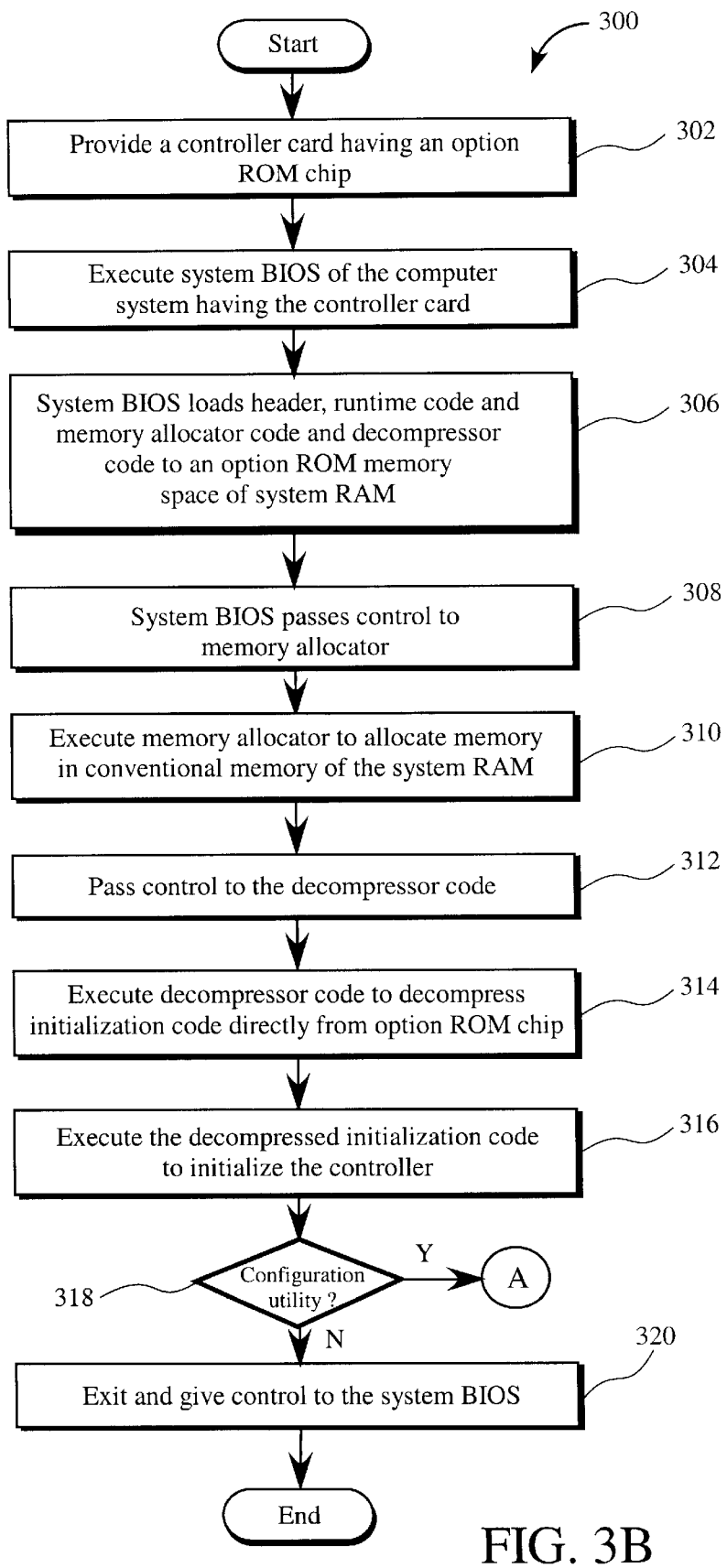
FIG. 3B illustrates a flowchart diagram that defines the method operations of the embodiment of FIG. 3A.

FIG. 3B illustrates a flowchart diagram 300 that defines the method operations of the embodiment of FIG. 3A. The method begins at an operation 302 where a controller card having an option ROM chip is provided. In operation 304, the system BIOS of the computer system having the controller card, controller chip, or host adapter card associated therewith is executed. The system BIOS will in operation 306 load the header, the runtime code, the memory allocator, and the decompressor code to the option ROM memory space of the system RAM. It should be noted that in this embodiment the decompresor code is loaded to the option ROM memory space, however, the amount of memory space occupied by the decompressor code is only around 4K in size. Of course, the size of the decompressor code can vary, depending on the controller application and other well known considerations.

The method now proceeds to operation 308 where the system BIOS passes control to the memory allocator and then the memory allocator is executed in operation 310. The execution of the memory allocator is configured to allocate conventional memory space for holding decompression parameters and a decompressed version of the initialization code. Now, the method moves to operation 312 where control is passed to the decompressor code and the decompressor code is executed in operation 314. The execution of the decompressor code is configured to decompress the initialization code directly from the option ROM chip and to the allocated conventional memory of the system RAM.

The decompressed initialization code is then executed in operation 316 in order to initialize the controller. As mentioned above, the controller can be in the form of a controller chip, a controller card, a host adapter card, and the like. The devices connected to the controller will therefore be accessible to the user of the computer system. If configuration utility operation is desired by the user, the user may interrupt the process which moves the method operation from 318 to A of FIG. 4. If no configuration utility operation is desired, the method will proceed to operation 320 where the initialization method will exit and control will return to the system BIOS. At this point, the computer system can move toward bootup if all other known house keeping initialization operations are complete.

Figure 4:
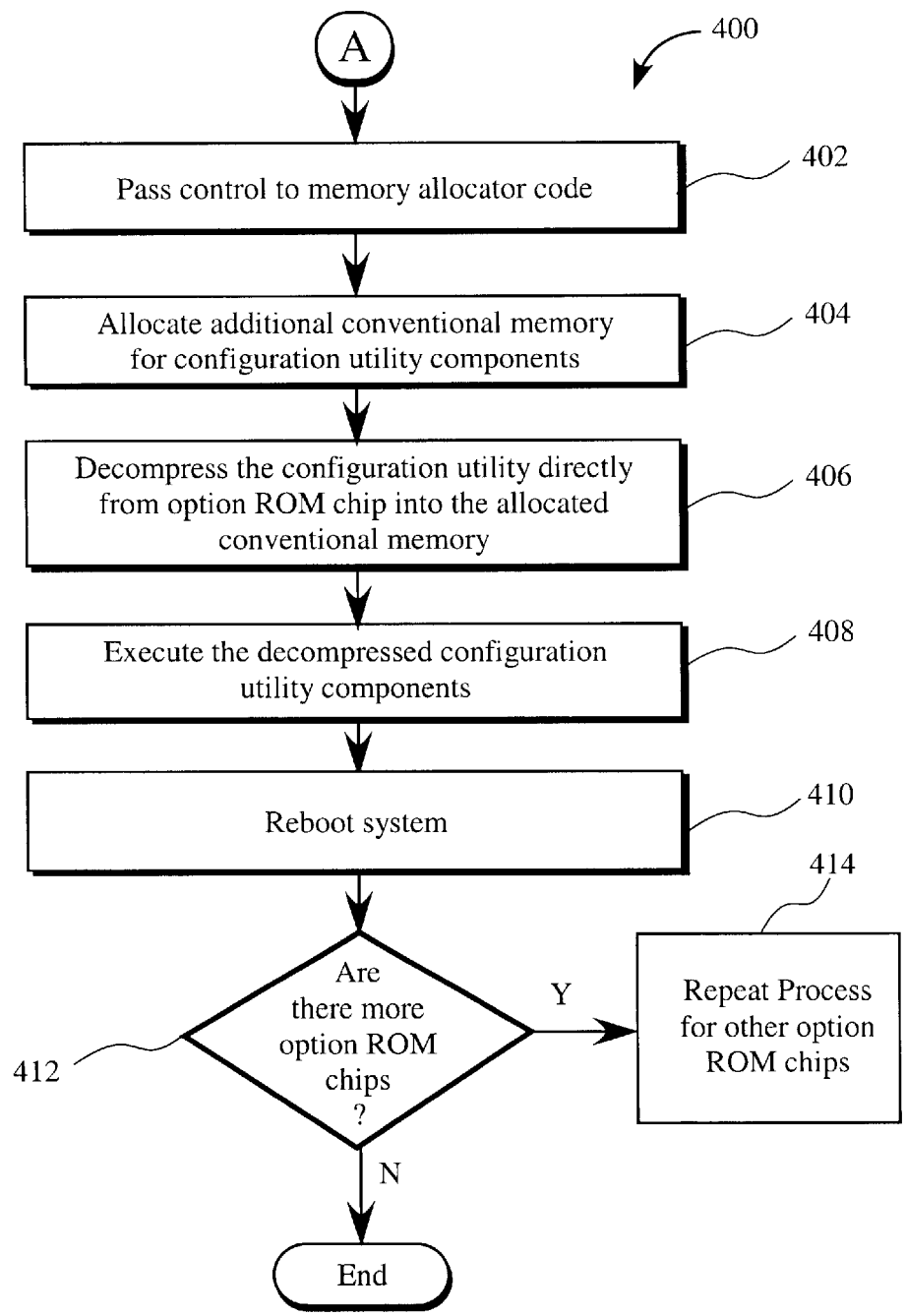
FIG. 4 illustrates a flowchart diagram that defines the method operations performed when a user desires to use the configuration utilities, in accordance with one embodiment of the present invention.

FIG. 4 illustrates a flowchart diagram 400 that defines the method operations performed when a user desires to use the configuration utilities, in accordance with one embodiment of the present invention. The method begins at an operation 402 where control is passed to the memory allocator code. Once control is passed, the method moves to operation 404 where additional conventional memory is allocated for configuration utility components. The decompressor will then decompress the configuration utility directly from the option ROM chip into the allocated conventional memory. As mentioned above, the configuration utility is therefore only decompressed into the conventional memory when the user wants to implement features of the configuration utility. In one example, the decompressed configuration utility may include 32K of SCSI configuration, and 32K of container configuration. Furthermore, it should also be noted that the configuration utility does not need to be loaded into the option ROM memory space at all, which is not the case in the prior art. This therefore provides a download on demand (DOD) functionality.

Once the configuration utility has been decompressed into the conventional memory, the decompressed configuration utility is executed in operation 408. When the user has performed the desired configurations, for either a SCSI controller or a RAID controller, the system is rebooted 410. In operation 412 it is determined whether there are any more option ROM chips associated with the system for which initialization and configuration is desired. If yes, the initialization and configuration is then repeated for each of the option ROM chips. If no, then the method will be done.

It should be understood that the embodiments of the present invention provide methods that enable intelligent initialization of controllers, host adapter cards, and the like, which have associated option ROM BIOS images. The intelligent initialization enables only part of the BIOS image of an option ROM BIOS chip to be loaded into the option ROM memory space of system RAM. Then, code that was not loaded to the option ROM memory space may be decompressed directly from the chip to conventional memory.

The present invention may implemented using an appropriate type of software driven computer-implemented operation. As such, various computer-implemented operations involving data stored in computer systems to drive computer peripheral devices (i.e., in the form of software drivers) may be employed. These operations are those requiring physical manipulation of physical quantities. Usually, though not necessarily, these quantities take the form of electrical or magnetic signals capable of being stored, transferred, combined, compared and otherwise manipulated. Further, the manipulations performed are often referred to in terms such as ascertaining, identifying, scanning, or comparing.

Any of the operations described herein that form part of the invention are useful machine operations. Any appropriate device or apparatus may be utilized to perform these operations. The apparatus may be specially constructed for the required purposes, or it may be a general purpose computer selectively activated or configured by a computer program stored in the computer. In particular, various general purpose machines may be used with computer programs written in accordance with the teachings herein, where it may be more convenient to construct a more specialized apparatus to perform the required operations.

Although the foregoing invention has been described in some detail for purposes of clarity of understanding, it will be apparent that certain changes and modifications may be practice within the scope of the appended claims. Accordingly, the present invention is to be considered as illustrative and not restrictive, and the invention is not to be limited to the details given herein, but may be modified within the scope and equivalence of the appended claims.

What is claimed is:

1. A method of conserving memory resources available to a computer system during execution of system BIOS, wherein said computer system includes a processing component having an associated BIOS image that is characterized at least in part by a header, a runtime code and an initialization code, said computer system further including a system RAM having an option ROM memory space of a confined size for accommodating at least a portion of said BIOS image, said method adapted to reduce the amount of memory within said option ROM memory space that is occupied by said BIOS image during execution of a boot sequence thereby to allow for proper initialization of the processing component, said method comprising:

(a) loading into the option ROM memory space the portion including at least the header and runtime code associated with said BIOS image;

(b) allocating conventional memory of the system RAM, the allocated conventional memory being sized to accommodate at least a decompressed version of the initialization code associated with said BIOS image;

(c) loading said decompressed version of the initialization code directly from said BIOS image into said allocated conventional memory; and (d) executing said decompressed version of the initialization code to initialize the processing component.

2. The method according to claim 1, wherein the option ROM memory space is located in the system RAM between hexadecimal addresses C000:00 and DFFF:00, inclusively, and wherein said operation of loading the header and runtime code associated with said BIOS image is accomplished by reading the header and runtime code from said BIOS image and copying the header and runtime code into the option ROM memory space beginning at hexadecimal address C800:00.

3. The method according to claim 1, wherein the loaded portion further includes memory allocator code that allocates the conventional memory, and after the allocation of (b), the method further comprises:

loading a decompressor code into the allocated memory; and decompressing the initialization code directly from the BIOS image that is part of a option ROM BIOS chip.

4. The method according to claim 1, wherein said BIOS image additionally includes a configuration utility and wherein said conventional memory is sufficiently sized to accommodate each of said decompressed version of the initialization code and a decompressed version of the configuration utility.

5. The method according to claim 4, further comprising:

loading said decompressed version of said configuration utility directly from said BIOS image into said conventional memory in response to a user interrupt signal.

6. The method according to claim 5, further comprising:

executing said decompressed version of said configuration utility following said interrupt signal; and rebooting the computer system.

7. The method according to claim 3, wherein the computer system includes a plurality of processing components each having an associated said BIOS image, and wherein operations (a) through (d) are repeated for each said BIOS image thereby to allow for proper initialization of said processing components.

8. A method of conserving memory resources available to a computer system during execution of a system BIOS, wherein said computer system includes an adapter card having an associated option ROM BIOS chip that includes a compressed BIOS image characterized at least by a header, a runtime code, a memory allocator code, a compressed initialization code, a compressed configuration utility and a decompressor code, said computer system further including a system RAM having an option ROM memory space of a confined size for accommodating at least a portion of said BIOS image, said method for reducing the amount of memory within said option ROM memory space that is occupied by said BIOS image during said boot sequence, said method comprising:

(a) executing the system BIOS;

(b) loading the header, runtime code, and memory allocator code associated with said option ROM BIOS chip into the option ROM memory space;

(c) passing control to said memory allocator code;

(d) executing said memory allocator code to allocate conventional memory of the system RAM;

(e) copying the decompressor code directly from said option ROM BIOS chip to the allocated conventional memory;

(f) passing control to said decompressor code;

(g) executing said decompressor code to decompress said compressed initialization code directly from said option ROM BIOS chip and to load the decompressed initialization code into said conventional memory; and (h) executing said decompressed initialization code to initialize said adapter card.

9. The method according to claim 8, wherein said conventional memory area is sufficiently sized to accommodate each of the uncompressed initialization code and the decompressor code associated with said option ROM BIOS chip.

10. The method according to claim 8, including the operations of allocating, in response to a user interrupt signal, an additional memory area within the conventional memory that is sufficiently sized to accommodate an uncompressed configuration utility associated with said option ROM BIOS chip.

11. The method according to claim 10, including the operations of passing control to said decompressor code in order to decompress the configuration utility into the uncompressed configuration utility, and thereafter loading the uncompressed configuration utility into said conventional memory.

12. The method according to claim 11, including the operations of executing said configuration utility after detection of the user interrupt signal and thereafter rebooting the computer system.

13. The method according to claim 8, wherein the option ROM memory space is located in the system RAM between hexadecimal addresses C000:00 and DFFF:00, inclusively, and wherein said operation of loading the header, runtime code and memory allocator associated with said option ROM BIOS chip is accomplished by reading the header, runtime code and memory allocator from the option ROM BIOS chip and copying to the option ROM memory space.

14. The method according to claim 8, wherein said conventional memory area of the computer system is located in the system RAM between hexadecimal addresses 2000:00 and A000:00, inclusively.

15. A method of conserving memory resources available to a computer system during execution of a system BIOS, said method comprising:

loading a header, a runtime code, and a memory allocator code associated with an option ROM BIOS chip into an option ROM memory space of a system RAM, the option ROM BIOS chip being associated with a controller;

executing said memory allocator code to allocate conventional memory of the system RAM;

copying the decompressor code from said option ROM BIOS chip to the allocated conventional memory;

executing said decompressor code to decompress initialization code directly from said option ROM BIOS chip to load the decompressed initialization code into said conventional memory; and executing said decompressed initialization code to initialize said controller.

16. A method of conserving system memory resources available to a computer system during boot up, the method comprising:

executing a system BIOS;

loading a header, a runtime code, a memory allocator code, and a decompressor code associated with an option ROM BIOS chip of a controller into an option ROM memory space of system memory;

passing control to said memory allocator code;

executing said memory allocator code to allocate conventional memory of the system memory;

passing control to said decompressor code;

executing said decompressor code to decompress initialization code directly from the option ROM BIOS chip to the allocated conventional memory; and executing said decompressed initialization code to initialize said controller.

17. A method of conserving system memory resources available to a computer system during boot up as recited in claim 16, wherein said controller is integrated on a motherboard of the computer system or a host adapter card.

18. A method of conserving system memory resources available to a computer system during boot up as recited in claim 16, wherein the controller is one of a RAID controller and a SCSI controller.

19. A method of conserving system memory resources available to a computer system during boot up as recited in claim 18, wherein said conventional memory is sufficiently sized to accommodate each of the uncompressed initialization code and decompression components associated with said option ROM BIOS chip.

20. A method of conserving system memory resources available to a computer system during boot up as recited in claim 16, wherein the initialization code is not loaded into the option ROM memory space.

21. A computer implemented method, comprising:

loading a header, a runtime code, a memory allocator code, and a decompressor code associated with an option ROM BIOS chip of a controller into an option ROM memory space of system memory;

executing said memory allocator code to allocate conventional memory of a system memory;

executing said decompressor code to decompress initialization code directly from the option ROM BIOS chip to the allocated conventional memory; and executing said decompressed initialization code to initialize said controller.

* * * * *